(12) United States Patent
Bockmeyer et al.

(10) Patent No.: US 9,194,986 B2
(45) Date of Patent: Nov. 24, 2015

(54) OPTICAL FILTERS, THEIR PRODUCTION AND USE

(71) Applicant: Schott AG, Mainz (DE)

(72) Inventors: Matthias Bockmeyer, Mainz (DE); Ralf Biertuempfel, Mainz-Kastel (DE)

(73) Assignee: SCHOTT AG, Mainz (DE)

( * ) Notice: Subject to any disclaimer, the term of this patent is extended or adjusted under 35 U.S.C. 154(b) by 124 days.

(21) Appl. No.: 13/954,117

(22) Filed: Jul. 30, 2013

(65) Prior Publication Data

US 2014/0029108 A1    Jan. 30, 2014

(30) Foreign Application Priority Data

Jul. 30, 2012 (DE) .................. 10 2012 213 315

(51) Int. Cl.
*G02B 5/20* (2006.01)
*B82Y 20/00* (2011.01)

(52) U.S. Cl.
CPC ................ *G02B 5/205* (2013.01); *B82Y 20/00* (2013.01); *G02B 5/206* (2013.01); *G02B 2207/101* (2013.01)

(58) Field of Classification Search
CPC .. G02B 5/205; G02B 5/206; G02B 2207/101; B82Y 20/00
USPC ........... 359/642, 885, 888; 427/162, 553, 557
See application file for complete search history.

(56) References Cited

U.S. PATENT DOCUMENTS

| 3,170,890 A | 2/1965 | Boyd et al. |
| 3,585,065 A | 6/1971 | Johnson |
| 4,107,148 A | 8/1978 | Fujiyoshi et al. |
| 4,738,798 A | 4/1988 | Mahler |
| 4,879,344 A | 11/1989 | Woo et al. |
| 6,819,040 B2 * | 11/2004 | Parsapour et al. ............ 313/479 |
| 2009/0185113 A1 | 7/2009 | Chung |
| 2010/0246009 A1 | 9/2010 | Polley et al. |

FOREIGN PATENT DOCUMENTS

DE    102009036134    2/2011

OTHER PUBLICATIONS

Brown, Lawrence H., "Silicones in Protective Coatings," Dow Corning Corporation, Midland, Michigan, pp. 514-562.
German Office Action dated Mar. 15, 2013 (with English Translation) from German Patent Application No. 10 2012 213 315.1, 16 pages.

* cited by examiner

*Primary Examiner* — David N Spector
(74) *Attorney, Agent, or Firm* — Ohlandt, Greeley, Ruggiero & Perle, LLP

(57) ABSTRACT

Optical filters, their production and their uses are provided. The optical filters have heat-resistant, mechanically stable absorption layers or filter layers. The optical filters can be absorption filters or ND filters. The filter layer includes filter particles dispersed in a matrix. The filter particles have a constant absorption over a wide wavelength range. The matrix includes a heat-resistant binder.

17 Claims, 2 Drawing Sheets

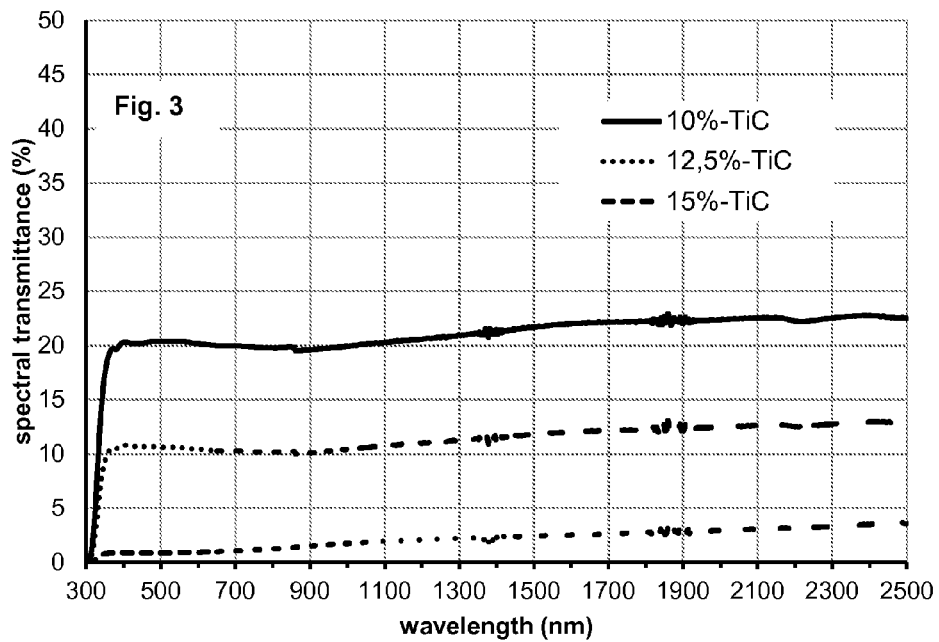
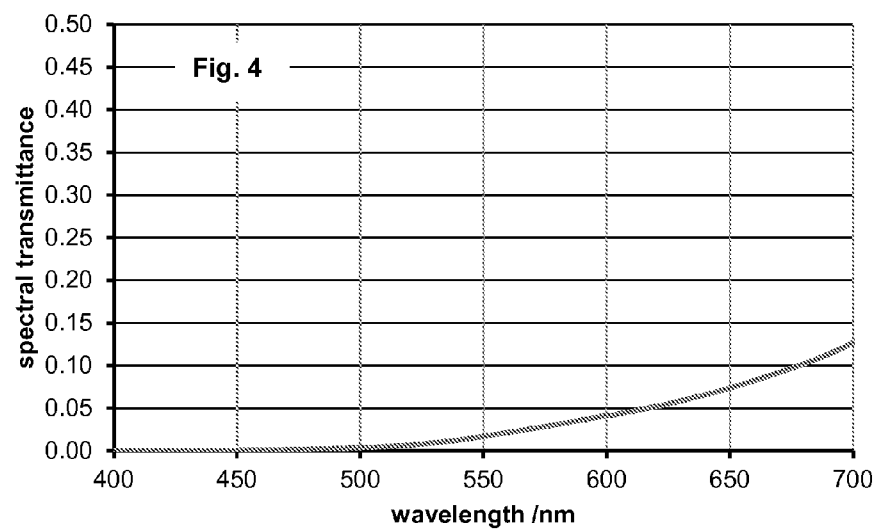

OPTICAL FILTERS, THEIR PRODUCTION AND USE

CROSS REFERENCE TO RELATED APPLICATIONS

This application claims benefit under 35 U.S.C. §119(a) of German Patent Application No. 10 2012 213 315.1, filed Jul. 30, 2012, the entire contents of which are incorporated herein by reference.

BACKGROUND OF THE INVENTION

1. Field of the Invention

The invention relates to optical filters, their production and their uses. In particular, present invention provides neutral density filters (ND filters) which have heat-resistant, mechanically stable absorption layers or filter layers. A lens or objective equipped with the filter of the invention is also provided by the invention.

2. Description of Related Art

A neutral density filter (German: "Graufilter" or "Neutraldichtefilter"), reduces the quantity of light coming through a lens. This leaves the colour character of the light unchanged. Absorption filters can consist of an absorbing glass, an absorbing polymer, thin polymer layers on glass or of coated glasses.

Bulk-coloured ND filters have very different colorant concentrations. Thus, there are firstly very light-grey variants having a low colorant concentration and secondly also ND filters which appear black to the naked eye, e.g. the SCHOTT glass NG which at a thickness of 1 mm has a transmission of less than $10^{-3}$.

However, absorbing glasses are generally very thick as components and therefore cannot be used everywhere. Filters composed of absorbing polymers are likewise usually excessively large components and the thermal stability which is sometimes necessary and the optical properties are not satisfactory. In addition, the lifetime of polymers is insufficient.

Filters based on thin polymer layers are likewise not thermally stable enough for particular applications. This is usually due to the unsatisfactory thermal stability of the polymeric materials. Depending on the polymer, the material is stable only up to 120° C. For example, U.S. Pat. No. 4,738, 798 A discloses a coating comprising nanoparticles which are incorporated into a polymer matrix which is not suitable for high temperatures.

Furthermore, absorbing colorants which are also organic materials and also have a reduced thermal stability are often used in polymeric filters. In addition, polymeric materials often have an unsatisfactory life or the optical and mechanical properties change during the life of the materials.

Filters based on coated glasses are typically based on vapour-deposited metal layers (for example an Inconel coating). Manufacture is very expensive and not suitable for large-area filters.

DE 10 2009 036 134 A1 discloses coatings comprising nanoparticles which are so large that they lead to light scattering. However, scattering is undesirable in optical filters.

US 2010/0246009 A1 discloses nanoparticles in a matrix which produce a particular colour or protect against UV rays.

It is therefore an object of the present invention to provide optical neutral density filters which are at the same time thermally stable, mechanically strong and can be produced inexpensively in small sizes.

SUMMARY OF THE INVENTION

According to a first aspect of the invention, an optical ND filter is provided.

According to a second aspect, a process for producing an optical ND filter comprising a substrate and a filter layer, wherein the filter layer comprises a matrix and nonoxidic filter particles, the matrix comprises a binder and the filter particles have filter properties and an average particle size of not more than 200 nm and the transmission of the filter changes by a maximum of at most +/−10% in a wavelength range from 405 to 700 nm, which comprises the following steps: dispersion of the filter particles in the binder, coating of the substrate, and curing of the binder, is provided.

These and other aspects and objects, features and advantages of the present invention will become apparent upon a consideration of the following detailed description and the invention when read in conjunction with the drawing Figures.

It is to be understood that both the foregoing general description and the following detailed description are merely exemplary of the invention, and are intended to provide an overview or framework for understanding the nature and character of the invention as claimed.

DESCRIPTION OF THE DRAWINGS

FIG. 3 shows the transmission curve of a filter according to the present disclosure having different concentrations of nonoxidic TiC filter particles.

FIG. 4 shows the transmission curves of a further filter according to the disclosure containing a mixture of CdSe and CdTe.

DETAILED DESCRIPTION

Figure 1:
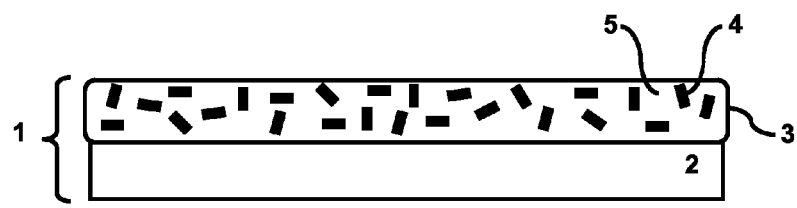
FIG. 1 schematically shows an embodiment of the filter of the present disclosure.

FIG. 1 schematically shows an embodiment of a filter 1 that includes substrate 2 and filter layer 3 on the substrate 2. Filter layer 2 in turn comprises a transparent matrix 5 and nonoxidic filter particles 4 uniformly distributed in this matrix 5.

The substrate is typically transparent; in particular, the substrate is selected from the group consisting of glass, glass-ceramic, plastic, ceramic or mixtures thereof. Glass, glass-ceramic and ceramic are preferred. Particular preference is given to optical specialty glass, transparent glass-ceramic and transparent ceramic (optoceramic). The combination of such a substrate with the heat-resistant filter layer has the advantage that the filter has adequate thermal stability and resistance.

The filter layer preferably consists of the matrix and the filter particles.

The matrix preferably consists of a material which is optically inactive in the relevant wavelength range, i.e. is transparent or has a transmission of at least 80%, preferably at least 90%, more preferably at least 95%, and is thermally stable up to more than 200° C. The optical filter effect is preferably brought about solely by or essentially by the nonoxidic filter particles having an absorption in the relevant wavelength range.

For the purposes of the invention, the "relevant wavelength range" is, in particular, the wavelength range from 405 to 700 nm, preferably from 400 to 800 nm according to one embodiment from 400 to 2500 nm. In particular embodiments, the relevant wavelength range can commence at 300 nm, 330 nm, 350 nm, 380 nm or 400 nm as long as substrate and matrix have sufficient transparency in the UV range. Furthermore, the upper limit of the relevant wavelength range can be 1500 nm, 1000 nm or 800 nm as long as this is satisfactory for the planned use.

The nonoxidic filter particles preferably have a constant filter effect in the relevant wavelength range and, due to their nanosize nature, lead to no or negligible scattering losses in respect of the optical filter.

The degree of optical filter effect, i.e. the residual transmission, can be adjusted via the mass content (reported in % by weight) of the nonoxidic filter particles in the filter layer and the applied layer thickness.

Compared to bulk-coloured filter glasses, this makes it possible to apply heat-resistant and degradation-stable filter layers and give significantly greater design freedom in the selection of the optical position in the Abbe diagram, i.e. in respect of the refractive index and/or the Abbe number of the glasses.

The filters of the invention are preferably stable over a test period of 1 hour up to at least 200° C., more preferably up to at least 300° C. and particularly preferably up to at least 380° C. In particular, there is no significant change in the transmission due to the use of the thermally stable matrix and there is no additional absorption due, for example, to yellowing of the matrix material as a result of organic decomposition reactions. For the present purposes, a significant change is a change of greater than +/−5%, in particular greater than +/−3%.

Furthermore, due to the inorganic nature of the filter particles, there is no change in the absorption due to thermally induced organic decomposition of the absorbing medium, as occurs, for example, when using organic absorbing filter media.

Furthermore, when using the filter layers according to the invention based on nonoxidic filter particles, it is possible, in contrast to purely organic filter layers, to provide filters on glass which achieve a constant filter effect up to a wavelength of 2500 nm, viz. into the infrared (IR) range.

The filter layer of the filter of the invention preferably has a layer thickness of at least 100 nm and not more than 100 µm.

The filter layer preferably has essentially constant absorption and only slight to no light scattering in the total relevant wavelength range. Thus, when using a filter layer according to the invention, the transmission in the relevant wavelength range preferably changes by not more than +/−10%, more preferably not more than +/−7% and very particularly preferably not more than +/−5%.

The invention makes it possible to provide specific optical filters having different transmission values. According to the invention, it is possible to produce, for example, optical filters having a transmission of 7%+/−3% or 9%+−3%, especially in a wavelength range from 405 to 700 nm.

In a particular embodiment of the filter, the transmission in a wavelength range from, in particular, 405 to 700 nm has a variation of not more than +/−10%, more preferably not more than +/−5% and particularly preferably not more than +/−3%. Here, "variation" means the absolute deviation from the respective transmission value.

The haze value of the filter layer (opacity, clouding) is preferably less than 5%, more preferably less than 3%, very particularly preferably less than 1%. The haze value is preferably determined using a Haze-guard Plus measuring instrument from Byk.

The filter layer has excellent scratch resistance and adhesion and passes cross-hatching cutting tests, adhesive tape tests, sclerometer tests with a load of 500 g, scouring test, etc.). The filter layer has a long life with constant absorption properties. The filter passes, in particular, the heat and humidity test in accordance with IEC/EN/DIN EN 60068-2-67 and IEC/EN/DIN EN 60068-2-78.

The filter layer of the optical filter can be applied using an inexpensive liquid coating process. Preferred processes are inkjet, doctor blade coating, screen printing, spin coating, dip coating, roll coating, with particular preference being given to inkjet, spin coating and screen printing.

The filter layer of the present invention preferably consists of a matrix and nonoxidic filter particles. The matrix preferably contains a composite material, in particular an organic/inorganic or inorganic/inorganic composite material. Nonoxidic filter particles which absorb in the optically relevant wavelength range and have constant absorption are present in the matrix. The matrix preferably contains an organic, inorganic or hybrid-polymer binder. The binder preferably displays no or only slight absorption (less than 1%), especially in the relevant wavelength range. The binder can be a hybrid polymer.

The binder preferably comprises at least one polymer and/or sol-gel material. The binder can additionally or instead comprise glass fluxes and/or glass frits.

Preferred polymers are selected from among polysiloxanes, silicones, polyimides, polyurethanes, polyaryl ether ketones, polyphenylene sulphides, silicone resins, silazanes and mixtures of these substances. A particularly preferred polymer is SiliXane™. The polymers can be UV-curable or thermally curable polymers.

Preferred silicone resins have phenyl and/or methyl groups. The silicone resins can also be functionalized further. In that case, these resins bear functional groups selected from the group consisting of vinyl, methacryl, epoxy, butyl and ethyl groups and mixtures thereof.

Furthermore, a glass solder or a glass frit can be used as binder in a specific embodiment of the invention. Use is made of, for example, tin phosphate glasses, preferably with tin in the oxidation state Sn(II). Furthermore, it is possible to use tin-zinc phosphate glasses, lead borate glasses, lead silicate glasses, oxyfluorides, silicate glasses and/or sulphophosphate glasses. In a particular embodiment, bismuth and/or zinc borate glasses are also used.

The glass solder or the glass frit is preferably produced from a glass by milling to a powder. The average particle size of the glass powder is in the range from 300 nm to 10 µm, preferably from 500 nm to 5 µm, very particularly preferably from 800 nm to 3 µm. The particle size is preferably determined using the method of dynamic light scattering or microscopically. In the case of the microscopic determination, the Ferret diameter is determined.

Preference is given to selecting a glass flux which does not chemically attack the filter particles. Furthermore, preference is given to using a glass flux which has a melting point below 600° C., more preferably below 500° C. and very particularly preferably below 450° C. Preference is given to using a glass flux which has no intrinsic colour or absorption greater than 1%, especially in the wavelength range from 300 nm upwards, preferably from 350 nm upwards, and/or up to 2500 nm, 1500 nm or 1000 nm. While polymeric materials are generally not transparent in the UV range, glasses having good transparency even at wavelengths of less than 400 nm are known to those skilled in the art.

In preferred embodiments, the binder comprises sol-gel materials. Sol-gel materials are substances which have formed an inorganic network in a sol-gel reaction (i.e. hydrolysis and condensation). It is possible here to use UV or thermally organically crosslinkable hybrid-polymer sol-gel materials, hybrid-polymer sol-gel materials and/or sol-gel materials functionalized with nanoparticles.

The sol-gel materials are formed using sol-gel precursors. Such processes are known in principle to those skilled in the art. In preferred embodiments, the binder comprises sol-gel materials and at least one silicone resin.

In preferred embodiments, polyurethane-modified sol-gel materials, epoxy modified and/or methacrylate-modified sol-gel materials are used.

The sol-gel material is formed by condensation reactions of sol-gel precursors. The sol-gel precursors preferably comprise alkoxysilanes. Preference is given to alkoxysilanes which are functionalized by epoxy, methacrylate, allyl and/or vinyl groups. Preferred alkoxy silanes are tetraalkoxysilanes, methyltrialkoxysilanes and mixtures thereof.

The condensation of the sol-gel precursors is preceded by hydrolysis. The hydrolysis is preferably carried out in an acidic or alkaline medium. For the present purposes, acidic preferably means a pH of from 1 to 4 and alkaline preferably means a pH of from 8 to 11. The hydrolysis is preferably carried out in the presence of para-toluenesulphonic acid.

In a particularly preferred embodiment, the hydrolysis is carried out using an aqueous nanoparticle dispersion. This means that the sol-gel precursors are mixed with the nanoparticle dispersion in order to start the hydrolysis. The nanoparticles mentioned here are different from the abovementioned nonoxidic filter particles. They are preferably oxidic in nature and can consist of, in particular, $Al_2O_3$, $SiO_2$, $TiO_2$ and/or $ZrO_2$. The average diameter of the nanoparticles is in the range from 1 to 150 nm. The nanoparticles increase the scratch resistance of the filter layer and make it possible to adapt the refractive index of the filter layer.

In a further embodiment, $SiO_2$ nanoparticles are added to the matrix from alcoholic dispersion. Particular preference is given to monomodal, spherical particles having a size of from 5 to 125 nm being added to the matrix. In another preferred embodiment, fibrous $SiO_2$ particles having a diameter of from 5 to 15 nm and a length of from 5 to 150 nm are added to the matrix. Where mention is made of the average diameter of particles in the present patent application, this value is preferably measured by the method of dynamic light scattering.

In a particularly preferred embodiment, the binder comprises an alkoxysilane precursor which has been hydrolyzed and condensed in a sol-gel reaction, i.e. a sol-gel material. Sol-gel materials can be hybrid polymers if they are organically crosslinked.

The precursors are preferably selected from among (3-glycidoxypropyl)tri-ethoxysilane, (3-methacryloxypropyl)trimethoxysilane, (3-methacryloxypropyl)tri-ethoxysilane and mixtures thereof. In a preferred embodiment, crosslinkers are added to the binder. These are multiply crosslinkable organic and/or hybrid-polymer precursors. They can be, in particular, organic molecules which have two reactive functional groups, e.g. 3,4-epoxycyclohexylmethyl 3,4-epoxycyclohexanecarboxylate, diurethane dimethacrylate, triethylene glycol dimethacrylate or mixtures thereof. In a preferred embodiment, thermally inducible free-radical or cationic initiators known to those skilled in the art are added to the binder.

The sol-gel precursors are preferably amorphous or crystalline, preferably molecularly or colloidally disperse. Preferred sol-gel precursors contain silicon, titanium, zirconium, aluminium, zinc, magnesium, calcium or tin as metal component. The empirical formulae are then, for example, $SiOR_xR_y$, $TiOR_xX_y$, $ZrOR_xX_y$. Here, preference is given to R being hydrogen, alkyl or aryl and X being alkyl or aryl. The sum of the indices x and y is 4, i.e. x+y=4.

In a particularly preferred embodiment, the average particle size of the sol-gel precursor is in the range from 0.05 to 200 nm, particularly preferably from 1 to 100 nm. The particles can preferably be either spherical or fibrous or have an irregular shape.

In a particular embodiment of the invention, the sol-gel reaction (hydrolysis and condensation) is carried out in a mixture of the appropriate precursors with the nonoxidic filter particles. As a result, the filter particles are incorporated by reaction into the sol-gel material.

To compensate for the stresses occurring in the filter layer during curing or those occurring in some applications as a result of heat input and avoid consequent crack formation, a proportion of Si-organic compounds is preferably present in the matrix. Such compounds include, inter alia, the silicone resin and the sol-gel material. For the purposes of the present invention, "Si-organic compounds" are compounds which have a silicon-carbon bond (Si—C). Here, C is a carbon atom belonging to an organic radical (group). The organic radical is preferably selected from the group consisting of methyl, ethyl, propyl, butyl, phenyl, a fluorinated hydrocarbon radical and mixtures of these radicals.

These Si-organic compounds are either prepared via sol-gel reactions and/or introduced by addition of silicone resins to the matrix. Preference is given to using methyl-, ethyl- and/or phenyl-substituted alkoxysilanes in the sol-gel reaction and adding methyl- and/or phenyl-substituted silicone resins to the reaction.

In a specific embodiment, the binder consists entirely of silicone resins. Silicone resins display particular thermal stability. These silicone resins can optionally also contain other organic, crosslinking constituents. Suitable silicone resins for use in the invention are described in "Silicones in Protective Coatings" by Lawrence H. Brown in Treatise on Coatings Vol. 1, Part III; "Film-Forming Compositions", pp. 513-563, R. R. Meyers and J. S. Long eds. Marcel Dekker, Inc., New York, 1972. Suitable silicone resins are likewise described in U.S. Pat. Nos. 3,585,065, 4,107,148, 3,170,890 and 4,879,344.

The organic components of the silicone resins are preferably aryl, in particular phenyl, or short-chain alkyl, i.e. $C_1$-$C_4$-alkyl. To achieve good heat resistance methyl and/or phenyl groups in the organic components are the preferred choice. In general, the more phenyl groups are present, the higher the heat resistance provided. Examples of preferred silicone resins are phenyl silicone SY-430 sold by Wacker Silicone Corp., Conshohocken, Pa., U.S.A. and having an average molecular weight of about 1700, methylsilicone MK, likewise sold by Wacker, and methylphenylsilicone 6-2230 sold by Dow Corning Inc.

To achieve a high thermal stability, silicone resins which are used according to the invention preferably have a degree of substitution of typically from 0.5 to 1.5, preferably from 1.0 to 1.5. Specifically, the degree of substitution is defined as the average number of covalent silicon-carbon bonds (Si—C) per silicon atom. The degree of substitution is preferably determined by means of $^{29}$Si-NMR.

Preference is given to using silicone resins which spontaneously condense at high use temperatures. This requires a siloxane function (Si—OH) and the silicone resins which are preferably used here preferably have an OH content in the range from 1.0 to 7.5% by weight, preferably from 2 to 5% by weight, in the silicone resin. What is meant here is thus the proportion by weight of the bound hydroxyl groups in the molecule. The preferred silicone resins have a condensable hydroxyl content of from 1 to 4.5% by weight.

A preferred silicone resin in the binder has organic substituents selected from the group consisting of phenyl, methyl, $C_2$-$C_6$-alkyl and mixtures thereof. The silicone resin can preferably be a phenylmethylpolysiloxane.

The silicone resin preferably has a viscosity of from 100 to 10 000 cP at 150° C., preferably from 2000 to 5000 cP. The viscosity is preferably determined by means of a spindle rheometer from Brookfield. The silicone resin preferably has a glass transition temperature ($T_g$) of 55° C. or above, preferably 60° C. or above. The silicone resin preferably contains not more than 0.2% by weight of organic solvents, more preferably not more than 0.1% by weight.

In a preferred embodiment, polysilsesquisiloxane compounds (POSS) are also used as silicone resin. In specific cases according to the invention, these POSSs compounds can also contain further organically crosslinkable or polymerizable substituents. In a further specific embodiment of the invention, the binders can contain epoxide-functionalized siloxanes as are sold, for example, by 3M under the trade name ™Silorane.

As mentioned above, the binder contains, in a preferred embodiment, a sol-gel material and a silicone resin. This binder is preferably produced by mixing sol-gel precursors and silicone resin with one another before the sol-gel reaction. A composite material which bears both the organic substituents of the silicone resin and of the sol-gel precursors is thus formed. The corresponding binder thus preferably contains organic substituents selected from among alkyl (preferably methyl), phenyl, methacryl, epoxy, vinyl and allyl and mixtures thereof in its network.

The binder preferably has a total degree of substitution of from 0.5 to 1.5, more preferably from 0.7 to 1.5 and in particular from 0.8 to 1.3. In a preferred embodiment, the hydroxyl group content of the binder is from 1 to 5% by weight, more preferably from 1 to 4% by weight.

The Si:C ratio, which to a first approximation correlates directly with the oxide content of the binder, is preferably from 20:1 to 1:5, more preferably from 10:1 to 1:2. The Si:C ratio can be determined by means of elemental analysis.

The organic degree of crosslinking of the binder is preferably greater than 30%, particularly preferably greater than 50%. The degree of crosslinking is determined by Raman scattering measurements and is preferably measured by measuring the intensity of the band of the epoxy ring at 1259 $cm^{-1}$. The $CH_2$ vibration peak at 1299 $cm^{-1}$ is used for comparison. In a preferred embodiment, the binder is composed of hybrid-polymer $SiO_2$, with the layer having a significant content of silicone resin.

In particular embodiments, the matrix consists of the binder. The binder can also be a mixture of a plurality of the substances described herein as binder.

In a preferred embodiment, the matrix contains additives such as levelling agents, deaerators, antifoams and/or wetting agents.

To be able to obtain the filter layer of the invention, nonoxidic filter particles are added to the binder. A coating solution or paste is obtained by homogeneous dispersion of the nonoxidic filter particles in the binder. Accordingly, preference is given to using nonoxidic filter particles having an average particle size of less than 200 nm, more preferably less than 100 nm and very particularly preferably less than 50 nm, in particular embodiments even less than 20 nm. As a result, these particles do not cause any scattering in the filter layer.

The nonoxidic filter particles used have, owing to their specific materials composition a virtually wavelength-independent absorption in the relevant wavelength range, for example from 405 to 700 nm, preferably from 400 to 1500 nm, very particularly preferably from 405 to 700 nm. The variation is preferably not more than +/−10%, preferably not more than +/−5%, very particularly preferably not more than +/−3%.

The surface area of the nonoxidic filter particles which are preferably used is preferably greater than 10 $m^2/g$, more preferably greater than 30 $m^2/g$ and particularly preferably greater than 50 $m^2/g$.

The filter particles are preferably inorganic. The filter particles are preferably selected from the group consisting of carbides, nitrides, carbonitrides, oxynitrides, oxycarbides, fluorides, chalcogenides e.g. sulphides, selenides and tellurides, and mixtures thereof. The filter particles are particularly preferably selected from among nitrides, carbides, chalcogenides, e.g. sulphides, selenides and tellurides, and mixtures thereof. These particles are particularly suitable for setting the desired transmission. In particular, these particles are particularly suitable for setting a transmission having a low variation.

The nonoxidic filter particles preferably consist of compounds which are composed of a metal or semimetal component and an anionic component. The anionic component is, in particular, selected from the group consisting of the above-mentioned carbides, nitrides, carbonitrides, oxynitrides, fluorides, chalcogenides e.g. sulphides, selenides and tellurides, and mixtures thereof. The metal or semimetal component is preferably selected from the group consisting of Hf, Al, B, Si, Ge, Mo, Cd, Cr, Zr, Ti, W, Zn and mixtures thereof. Further preference is given to the metal or semimetal components being selected from the group consisting of Ti, Zr, W, Cd and mixtures thereof. These materials absorb with the low dependence according to the invention of the absorption on the wavelength of the light and are therefore particularly suitable. In a particular preferred embodiment, Ti(III)N (best with an primary particle size of from 10 to 20 nm and preferably with a surface area of from 70 to 90 $m^2/g$), Zr(IV)C, Ti(IV)C and/or W(IV)C are used. In a further embodiment, ZnS, CdSe, CdTe and mixtures thereof can be used. Mixtures of two or more of the nonoxidic particles mentioned can bring about an improvement in the absorption profile i.e. eliminate or improve a relatively small dependence of wavelength and absorption.

The measurement of the surface area of the nonoxidic filter particles is carried out by the method of $N_2$-sorption. The BET surface area known to those skilled in the art is reported. The particle size is determined in the powder state by means of scanning electron microscopy. The mean of the average particle diameter of 50 illustrative particles is determined. The particle size in solution is determined by the method of dynamic light scattering and/or the method of small-angle X-ray scattering.

Preference is given to using nonoxidic filter particles which can be dispersed down to the primary particle size. Preference is therefore given to using particles which are not or only slightly aggregated and only slightly agglomerated.

The nonoxidic filter particles used preferably have a primary particle size of from 1 to 100 nm, preferably from 4 to 50 nm, very particularly preferably from 8 to 30 nm. The aggregate size of the nonoxidic filter particles used is in the range from 1 to 100 nm, preferably from 4 to 50 nm, very particularly preferably from 8 to 30 nm. This means that the nonoxidic filter particles are not appreciably agglomerated. Usually, the primary particle size of a lot of nonoxidic filter particles is given as an average (primary) particle size, since the size of the particles within a lot is distributed in a small range around the average particle size.

Preference is given to using only slightly agglomerated nonoxidic filter particles or nonoxidic filter particles which can be readily dispersed in the binder. Primary particles are filter particles which can join together to form larger composite systems (agglomerates or aggregates).

For the purposes of the present invention, agglomerates are an assembly of weakly bound particles, aggregates or a combination thereof. The surface area of the agglomerates is approximately comparable to the sum of the surface areas of the individual parts. Agglomerates are also referred to as secondary particles (see also primary particles).

Particles which are strongly bound to one another are referred to as aggregates. Here, the surface area of the aggregate can be significantly lower than the sum of the surface areas of the individual constituents. Aggregates are, like agglomerates, classified as secondary particles.

The nonoxidic filter particles are preferably present in a proportion of at least 0.1% by weight, more preferably at least 2% by weight, most preferably at least 3% by weight, in the matrix. The proportion of nonoxidic filter particles is preferably not more than 40% by weight, more preferably not more than 25% by weight, most preferably not more than 20% by weight. The exact proportion will depend on the desired filter absorption and is within the range of 0.1 to 40% by weight not limited by the production process. 9

The following table shows preferred weight ranges of the various constituents of a filter layer according to the invention.

| Proportions in % by weight | Matrix | Nonoxidic filter particles |
|---|---|---|
| preferred | 60-99.9 | 0.1-40 |
| more preferred | 75-98 | 2-25 |
| particularly preferred | 80-97 | 3-20 |

The nanoparticles can be produced by liquid-phase or gas-phase reactions. The synthesis can, in particular, be based on precipitation and/or hydrothermal reactions or on flame pyrolysis or plasma vaporization.

In a preferred embodiment, the nonoxidic filter particles are functionalized or stabilized on their surface. Stabilization of the nonoxidic filter particles can be effected by means of surface-active substances or by means of chemical surface functionalization. Surface-active substances can be, for example, surfactants such as cetyltrimethylammonium bromide (CTAB) or polymeric additives such as polyvinylpyrrolidone (PVP).

The chemical surface functionalization can be effected, for example, by silanization of the nonoxidic filter particles by means of the Stöber process using organosilanes. For example, silanes such as methyltriethoxysilane, tetraethoxysilane, phenyltriethoxysilane, (3-glycidoxypropyl)triethoxysilane, (3-methacryloxypropyl)trimethoxysilane, (3-methacryloxypropyl)triethoxysilane or mixtures thereof can be used. In a specific embodiment, fluorosilanes can also be used.

In a specific embodiment, the matrix can comprise oxidic pigments and/or classical black pigments. For example, these can be Fe(II,III) oxide, Cu(II) oxide, manganese oxide, FeCr spinels, FeCo spinels, FeZn spinels, FeCrMn spinels, MnCr spinels, manganese ferrite or mixtures thereof. In a specific embodiment, the matrix can also comprise carbon blacks and/or carbon nanotubes as absorption pigments. In a specific embodiment, the matrix can also comprise metal and/or semimetal nanoparticles. These can be, in particular, Fe, Si and/or stainless steel nanoparticles.

The production of the filter layer preferably comprises the step of production of a coating solution. The coating solution can later be applied to the substrate. The coating solution does not have to be a perfect solution. It can also be a suspension, paste or emulsion. To produce a coating solution or paste according to the invention, the nonoxidic filter particles are preferably homogeneously dispersed in the binder or precursors thereof. For this purpose, it is possible to use, for example, an ultrasonic probe, a speed mixer, a three roll mill or a ball mill.

To apply the filter layer to the substrate, it is possible to employ various methods. Preferred methods have been mentioned above. The filter layer is preferably applied by applying the components of the matrix and the nonoxidic filter particles in liquid form. To obtain this liquid form, auxiliaries are preferably used.

Preferred auxiliaries are solvents. Solvents ensure, in particular, that the filter layer can be applied by a printing process. Solvents having a low vapour pressure (less than 2 mbar under normal conditions) are preferred in order to ensure good processability, in particular avoid blocking of the screen during screen printing. Preferred solvents are alcohols, ethers and mixtures thereof. Preference is given to using ethylene monoethyl ether or tripropylene glycol monomethyl ether.

In a particular embodiment, it is also possible to use reactive solvents. Reactive solvents are solvents which become constituents of the binder on film formation by chemical reaction (polymerization) and thereby lose their property as solvent.

In a preferred embodiment, the nonoxidic filter particles are used in the form of a powder. They are preferably dispersed in the binder by means of an Ultraturrax, by means of unitrasound, by means of a ball mill and/or by means of a three roll mill.

The nanoparticles are preferably finely dispersed in the binder. This means that the size ratio of the size of the agglomerated particles to the primary particle size is less than 3, preferably less than 2.

An illustrative coating solution according to the invention based on a polymeric and/or sol-gel-based binder consists of the binder, the nonoxidic filter particles solvent, initiator and additives.

If a glass is used as binder, the nonoxidic filter particles are applied together with the milled glass powder and a pasting medium to the substrate. In this way, a viscosity which is necessary for optimal processing is set.

The filter layer is preferably applied by means of one of the application methods doctor blade coating, roll coating, spraying, pad printing or screen printing. Preference is given to screen printing, inkjet and doctor blade coating. In a preferred embodiment, the filter layer is applied with only local structuring or cut-outs to the substrate.

After the coating step, the layer is generally cured. If a solvent-containing coating solution is used, the solvent is generally removed from the layer before the curing step.

Preferred proportions by weight of the various constituents of the coating solutions for application of filter layers to substrates are shown in the following table.

| Proportions in % by weight | Binder | Nonoxidic filter particles | Solvent | Initiator | Additives |
|---|---|---|---|---|---|
| preferred | 22-99 | 1-40 | 0-50 | <3 | <3 |
| more preferred | 41-82 | 2-21 | 15-45 | <2 | <2 |
| particularly preferred | 47-76 | 3-16 | 20-41 | <1 | <1 |

In a dried and cured filter layer, the mass ratio of nonoxidic filter particles to binder is from 100:1 to 3:1, preferably from 50:1 to 5:1, very particularly preferably from 20:1 to 6:1.

In a particular embodiment, the layer can also contain UV or thermally crosslinking constituents. The filter layers of the invention at the same time have a barrier effect, especially in respect of diffusion of $H_2O$ or oil. The high contact angle in relation to water and the low porosity due to the strongly inorganically/organically crosslinked binder network is responsible for this.

In a particular embodiment, the curing step can likewise be carried out thermally. In a preferred embodiment, the layers are thermally after-cured after a UV-based first curing. In this thermal after-curing, not only a further advantageous crosslinking of the binder constituents but especially also further crosslinking (condensation) of the hydroxyl groups (inter alia with elimination of alkoxyde groups) of the Si—O network occur. In particular, there is here also advantageous covalent bonding of a polysiloxane network composed of a silicone resin to a sol-gel network, preferably via condensation reactions. This crosslinking reaction preferably commences at temperatures in the range from 150 to 300° C., very particularly preferably at temperatures in the range from 220 to 270° C.

As substrate, preference is given to using a specialty glass (borosilicate glass, aluminosilicate glass, alkali-free glasses, thin glasses, from 100 µm to 1 mm thick, very thin glasses: from 25 µm to 100 µm) or an optical glass, as are available, for example, from SCHOTT AG under the names D263, B270, PSK glasses, BASF glasses, LAF glasses, LASF glasses, BK glasses or LF glasses, or a glass-ceramic. In a preferred embodiment, a thermal shock-resistant specialty glass or a glass-ceramic having a coefficient of thermal expansion of less than $4.0 \times 10^{-6}$/K, preferably less than $3.4 \times 10^{-6}$/K, is used. Preference is given to using a borosilicate glass or a lithium aluminium silicate glass-ceramic having a high-quartz mixed crystal phase or keatite.

In a particular embodiment, a prestressed substrate is used. Prestressing can be induced chemically or thermally.

In a further particular embodiment, a transparent ceramic, especially an optoceramic, is used.

The preferred layer thickness of the filter layer is in the range from 50 nm to 100 µm, preferably from 500 nm to 50 µm, very particularly preferably from 1 µm to 20 µm.

In a particular embodiment using hybrid polymers and/or silicone resins as binder, a preferred volume ratio of binder to nonoxidic filter particles is, dependent on the layer thickness, in the range from 1000:1 to 50:1.

In a particular embodiment, the optical filter is characterized in that it has a transmission of 90-10%+/−2%, preferably 85-50%+/−2%, very particularly preferably 80-70%+/−2%, in the relevant wavelength range, for example from 405 to 700 nm.

In a further embodiment of the invention, the filter has been applied to a substrate, in particular glass, having a thickness of from 100 µm to 3 mm, preferably from 500 µm to 2 mm, very particularly preferably from 800 µm to 1.5 mm.

Furthermore, further functional and/or decorative layers can be applied to the filter layer. These can be present on the substrate and/or between substrate and filter layer. The further layers or layer can be additional filter coatings, conductive layers, antireflection coatings, corrosion protection coatings, antifingerprint layers and/or scratch-resistant layers.

The optical filters of the present invention can be used, for example, in industrial optics and in photography. They are particularly suitable as ND filter or neutral filter. The present invention also provides a lens or objective equipped with the optical filter of the present invention.

The entire disclosures of all applications, patents and publications, cited above and below, and of corresponding German patent application No. DE 10 2012 213315 filed Jul. 30, 2012, are hereby incorporated by reference.

The present invention will be illustrated below by a series of examples. However, the present invention is not limited to the examples mentioned.

EXAMPLES

Hydrolysate for Sol-Gel Coating 0.06 mol of GPTES (glycidyloxypropyltriethoxysilane) together with 0.02 mol of TEOS (tetraethoxysilane) are placed in a vessel and hydrolyzed by means of 1.5 g of water in which 0.344 g of PTSH (para-toluenesulphonic acid) are dissolved. After stirring for 3 hours, the volatile reaction products formed are removed from the mixture on a rotary evaporator. This gives the hydrolysate.

Variant A-1

5 g of a methoxy-functionalized methylphenylsilicone resin and 0.3 g of 3,4-epoxycyclohexylmethyl 3,4-epoxycyclohexanecarboxylate are dissolved in 10 g of the hydrolysate. 8.5 g of a 30% strength by weight $SiO_2$ nanoparticle dispersion (particle size: from 10 to 15 nm) in diethylene glycol monoethyl ether are subsequently added thereto. 3.15 g of TiN filter particles (corresponding to 15% by weight of filter particles) are subsequently dispersed in the binder by means of an Ultraturrax.

0.5 ml of the cationic thermal initiator methylimidazole is subsequently added to the mixture. A layer is applied to one side of an optical glass by means of screen printing using a 140 screen. The final layer thickness of the cured filter layer was about 7 µm. The layer was thermally cured at 180° C. (1 h). The transmission of this filter is shown in FIG. 1 (broken line). The transmission of this filter changes by only +/−1.5% in the wavelength range from 400 to 2500 nm and the filter is stable to 280° C.

Variant A-2

13.5 g of a methylphenylsilicone resin in xylene (50% by weight) and 0.3 g of 3,4-epoxycyclohexylmethyl 3,4-epoxycyclohexanecarboxylate are added to 10 g of the hydrolysate. 2.45 g of TiN filter particles (corresponding to 12.5% by weight of filter particles) are subsequently dispersed in the binder by means of an Ultraturrax.

0.5 ml of the cationic thermal initiator methylimidazole is subsequently added to the mixture. A layer is applied to one side of an optical glass by means of screen printing using a 140 screen. The final layer thickness of the cured filter layer was about 7 µm. The layer was thermally cured at 260° C. (1 h). The transmission of this filter is shown in FIG. 1 (dotted line). The transmission of this filter changes by only +/−2% in the wavelength range from 400 to 2500 nm and the filter is stable to 280° C.

Variant A-3

15 g of a methylphenylsilicone resin in xylene (50% by weight) and 0.3 g of 3,4-epoxycyclohexylmethyl 3,4-epoxycyclohexanecarboxylate are added to 10 g of the hydrolysate. 1.96 g of TiN filter particles (corresponding to 10% by weight of filter particles) are subsequently dispersed in the binder by means of an Ultraturrax.

0.5 ml of the cationic thermal initiator methylimidazole is subsequently added to the mixture. A layer is applied to one side of an optical glass by means of screen printing using a 140 screen. The final layer thickness of the cured filter layer was about 7 µm. The layer was thermally cured at 260° C. (1 h). The transmission of this filter is shown in FIG. 1 (solid line). The transmission of this filter changes by only +/−2.5% in the wavelength range from 400 to 2500 nm and the filter is stable to 280° C.

The above and further examples are summarized in Tables 1 and 2. Examples A-4 to A-11 were conducted in the same way as Examples A-1 to A-3 above.

TABLE 1

Examples A-1 to A-6

|  | A-1 | A-2 | A-3 | A-4 | A-5 | A-6 |
|---|---|---|---|---|---|---|
| Filter particles | TiN | TiN | TiN | TiC | TiC | TiC |
| Average particle size [nm] | 20 | 20 | 20 | <40 | <40 | <40 |
| Surface [m²/g] | >80 | >80 | >80 | >50 | >50 | >50 |
| Concentration [wt.-%] | 10.0 | 12.5 | 15.0 | 10.0 | 12.5 | 15.0 |
| Layer Thickness [µm] | 15 | 15 | 15 | 15 | 15 | 15 |
| Transmission change (400-2500 nm) [%] | ±1.5 | ±2.0 | ±2.5 | ±2.5 | ±2.5 | ±3.0 |
| Stable up to 280° C. | Yes | Yes | Yes | Yes | Yes | Yes |

TABLE 2

Examples A-7 to A-11

|  | A-7 | A-8 | A-9 | A-10 | A-11 |
|---|---|---|---|---|---|
| Filter particles | CdSe + CdTe (1:1) | CdSe + CdTe + CdS (1:1:0.5) | WC | ZrN | TiON |
| Average particle size [nm] | <20 | <20 | 50 | 20 | 30 |
| Surface [m²/g] |  |  | 60 | >70 | 31 |
| Concentration [wt.-%] | 20.0 | 15.0 | 10.0 | 5.0 | 5.0 |
| Layer Thickness [µm] | 30 | 20 | 15 | 15 | 15 |
| Transmission change (405-700 nm) [%] | ±9.5 | ±8.0 | ±4.5 | ±5.0 | ±4.6 |
| Stable up to 280° C. | Yes | Yes | Yes | Yes | Yes |

Example B 0.06 mol of MPTES (methacryloxypropyltriethoxysilane) together with 0.02 mol of TEOS (tetraethoxysilane) are placed in a vessel and hydrolyzed by means of 1.5 g of water in which 0.344 g of PTSH (para-toluenesulphonic acid) are dissolved. After stirring for 3 hours, the volatile reaction products formed are removed from the mixture on a rotary evaporator. This gives the hydrolysate.

10 g of a 30% strength by weight $SiO_2$ nanoparticle dispersion (particle diameter: from 10 to 15 nm and particle length from 50 to 120 nm) are added to 10 g of the hydrolysate. 2 g of TiN filter particles (corresponding to 13.1% by weight of filter particles) are subsequently dispersed in the binder by means of an Ultraturrax. A free-radical photoinitiator is subsequently added to the mixture.

A layer is applied to one side of an optical glass by means of doctor blade coating using a gap width of 20 µm between doctor blade and substrate surface. The layer is photochemically cured. The layer is subsequently thermally after-cured at 180° C. (1 h). The final layer thickness of the cured filter layer is about 15 µm.

Example C 15 g of a hydroxy-functionalized methylphenylsilicone resin are dissolved in diethylene glycol monoethyl ether.

4 g of TiN filter particles (corresponding to 21% by weight of filter particles) are subsequently dispersed in the binder by means of an Ultraturrax. A layer is applied to one side of an optical glass by means of doctor blade coating using a gap width of 20 µm between doctor blade and substrate surface. The final layer thickness of the cured filter layer is about 15 µm. The layer is thermally cured at 270° C. (1 h).

Figure 2:
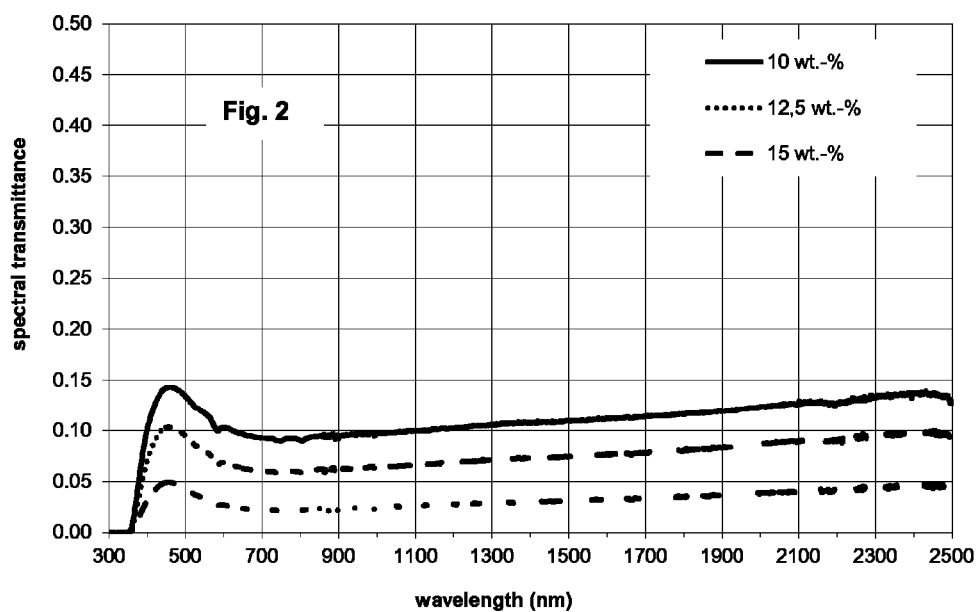
FIG. 2 shows the transmission curve of a filter according to the present disclosure having different concentrations of nonoxidic TiN filter particles.

FIGS. 2 and 3 show the transmission curves of filters according to the invention having different concentrations of nonoxidic TiN (FIG. 2) and TiC (FIG. 3) filter particles. The spectral transmission of the filter is virtually constant over the entire relevant wavelength range.

What is claimed is:

1. An optical neutral density filter comprising a substrate and a filter layer, the filter layer comprising a matrix and nonoxidic filter particles, wherein the matrix comprises a binder, wherein the filter particles have filter properties and an average particle size of not more than 200 nm, and wherein the optical neutral density filter has a transmission that changes by a maximum of at most +/−10% in a wavelength range from 405 to 700 nm.

2. The optical neutral density filter according to claim 1, wherein the binder is selected from the group consisting of at least one polymer, at least one sol-gel material, at least one glass flux, at least one glass frit, and any mixtures thereof.

3. The optical neutral density filter according to claim 1, wherein the substrate is selected from the group consisting of glass, glass-ceramic, ceramic, plastic, and any mixtures thereof.

4. The optical neutral density filter according to claim 1, wherein the filter particles have primary particle sizes of from 1 to 100 nm.

5. The optical neutral density filter according to claim 1, wherein the filter particles have secondary particle sizes of from 1 to 100 nm.

6. The optical neutral density filter according to claim 1, wherein the optical neutral density filter is adapted for use as a lens.

7. The optical neutral density filter according to claim 1, wherein the optical neutral density filter is adapted for use as an objective.

8. The optical neutral density filter according to claim 1, wherein the nonoxidic filter particles are inorganic and consist of compounds which are composed of a metal or semimetal component and an anionic component.

9. The optical neutral density filter according to claim 8, wherein the anionic component is selected from the group consisting of carbides, nitrides, carbonitrides, oxynitrides, fluorides, chalcogenides, sulphides, selenides and tellurides, and any mixtures thereof.

10. The optical neutral density filter according to claim 8, wherein the metal or semimetal component is selected from the group consisting of Hf, Al, B, Si, Ge, Mo, Cd, Cr, Zr, Ti, W, Zn, and any mixtures thereof.

11. A process for producing an optical neutral density filter comprising:
 dispersing nonoxidic filter particles in a matrix to form a dispersion, the nonoxidic filter particles having filter properties and an average particle size of not more than 200 nm, the matrix comprising a binder;
 coating a substrate with the dispersion; and
 curing the binder to form a filter layer comprising the binder and the nonoxidic filter particles so that the optical neutral density filter has a transmission that changes by a maximum of at most +/−10% in a wavelength range from 405 to 700 nm.

12. The process according to claim 11, further comprising removing solvent from the dispersion before curing the binder.

13. The process according to claim 11, wherein the matrix further comprises a proportion of Si-organic compounds.

14. The process according to claim 11, wherein the curing step comprises a thermal curing.

15. The process according to claim 11, wherein the curing step comprises a UV-based first cure followed by a thermally-based second cure.

16. The process according to claim 15, wherein the thermally-based second cure comprises temperatures in the range from 150 to 300° C.

17. The process according to claim 15, wherein the thermally-based second cure comprises temperatures in the range 220 to 270° C.

\* \* \* \* \*